United States Patent [19]

Knapp et al.

[11] Patent Number: 5,637,264
[45] Date of Patent: Jun. 10, 1997

[54] METHOD OF FABRICATING AN OPTICAL WAVEGUIDE

[75] Inventors: James H. Knapp, Chandler; Laura J. Norton, Apache Junction; Michael L. Majercak, Tempe; Michael C. Majercak, Chandler, all of Ariz.

[73] Assignee: Motorola, Inc., Schaumburg, Ill.

[21] Appl. No.: 536,600

[22] Filed: Sep. 29, 1995

[51] Int. Cl.⁶ .................................................. B29D 11/00
[52] U.S. Cl. .......................... 264/1.24; 264/2.5; 264/219
[58] Field of Search ........................... 264/1.1, 1.24, 264/1.25, 2.5, 219; 219/121.18, 121.19, 121.2

[56] References Cited

U.S. PATENT DOCUMENTS

| | | |
|---|---|---|
| 3,719,462 | 3/1973 | Andreatch, Jr. et al. |
| 5,009,475 | 4/1991 | Knudson. |
| 5,208,884 | 5/1993 | Groh et al. |
| 5,265,184 | 11/1993 | Lebby et al. |
| 5,389,312 | 2/1995 | Lebby et al. |
| 5,482,658 | 1/1996 | Lebby et al. .................. 264/1.24 |
| 5,545,359 | 8/1996 | Ackley et al. ................. 264/1.24 |

Primary Examiner—Mathieu D. Vargot
Attorney, Agent, or Firm—George C. Chen

[57] ABSTRACT

A method of fabricating an optical waveguide (10) includes using an electrical discharge machine (20) to fabricate mold plates (41, 61) for molding cladding layers (11, 12) of the optical waveguide (10). The cladding layers (11, 12) contain rounded edges (15, 16) which are aligned to form a cylindrical channel or core (13). The cylindrical shape of the channel (13) improves the reliability of the waveguide (10) compared to waveguides having a conventional square or rectangular channel with sharp corners. An optically transparent material (17) fills the cylindrical channel (13) and serves as the medium through which light is transmitted. The refractive index of the optically transparent material (17) is greater than that of the cladding layers (11, 12) to keep the light within the cylindrical channel. The optically transparent material (17) also serves as an adhesive for the cladding layers (11, 12).

20 Claims, 2 Drawing Sheets

METHOD OF FABRICATING AN OPTICAL WAVEGUIDE

BACKGROUND OF THE INVENTION

This invention relates, in general, to waveguides, and more particularly, to a method of fabricating an optical waveguide.

Optical fibers are used to enhance high speed communications such as chip to chip, board to chip, board to board, and even computer to computer communications. The use of optical fibers requires the use of optical devices such as vertical cavity surface emitting lasers (VCSELs). However, optical devices are often not directly attached to optical fibers. Instead, an optical waveguide is used to couple the optical device to the optical fiber. With the continuing efforts of device integration to produce smaller and more compact systems, the size of optical devices, waveguides, and fibers need to be reduced as well.

Conventional methods of manufacturing larger waveguides cannot be extended to manufacture miniature waveguides having a channel or core diameter on the order of hundreds of microns or smaller and having a channel or core length on the order of 2 centimeters or larger.

Accordingly, a need exists for a method of fabricating an optical waveguide which is simple, manufacturable, cost efficient, and produces a reliable waveguide.

DETAILED DESCRIPTION OF THE DRAWINGS

Briefly, a method of fabricating an optical waveguide includes using a traveling wire electrical discharge machine to fabricate mold plates for molding cladding layers of the optical waveguide. The cladding layers contain rounded edges which are aligned to form a cylindrical channel or core. The cylindrical shape of the channel improves the reliability of the waveguide compared to waveguides having a conventional square or rectangular channel with sharp corners. An optically transparent material fills the cylindrical channel and serves as the medium through which light is transmitted. The refractive index of the optically transparent material is greater than that of the cladding layers to keep the light within the cylindrical channel. The optically transparent material also serves as an adhesive for the cladding layers.

Figure 1:
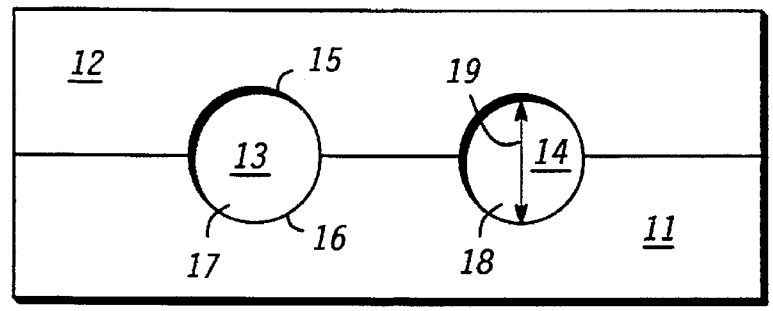
FIG. 1 illustrates a perspective view of an optical waveguide in accordance with the present invention.

Turning now to the figures for a more detailed description of the subject invention, FIG. 1 illustrates a perspective view of an optical waveguide 10 in accordance with the present invention. Optical waveguide or waveguide 10 includes portion 11 and portion 12 which are also known in the art as cladding layers. Portions or cladding layers 11 and 12 are aligned to form at least one channel or core 13. Channel 13 has curved or round edges 15 and 16. Curved edges 15 and 16 provide channel 13 with a preferred circular shape having a preferred diameter in the range of approximately 30 to 150 microns. Also formed by cladding layers 11 and 12, a channel 14 can be a different shape but preferably has a similar shape compared to that of channel 13.

It is understood that cladding layers 11 and 12 are greatly simplified and are depicted as symmetrical halves of waveguide 10 for simplicity and clarity of the subject invention. For instance, although not shown in FIG. 1, inter-locking and alignment mechanisms for can be included in cladding layers 11 and 12. Furthermore, while FIG. 1 depicts two channels 13 and 14 within waveguide 10, it is understood that a waveguide of the subject invention can contain a single channel or a plurality of channels. Additionally, a larger portion of channel 13 can be delineated or defined by curved edge 15 of cladding layer 12 compared to that of curved edge 16 of cladding layer 11.

A process for manufacturing the simplified cladding layers is discussed below. However, it is understood that the manufacturing process can be modified to incorporate additional details of cladding layers 11 and 12 which are not illustrated in FIG. 1.

Figure 2:
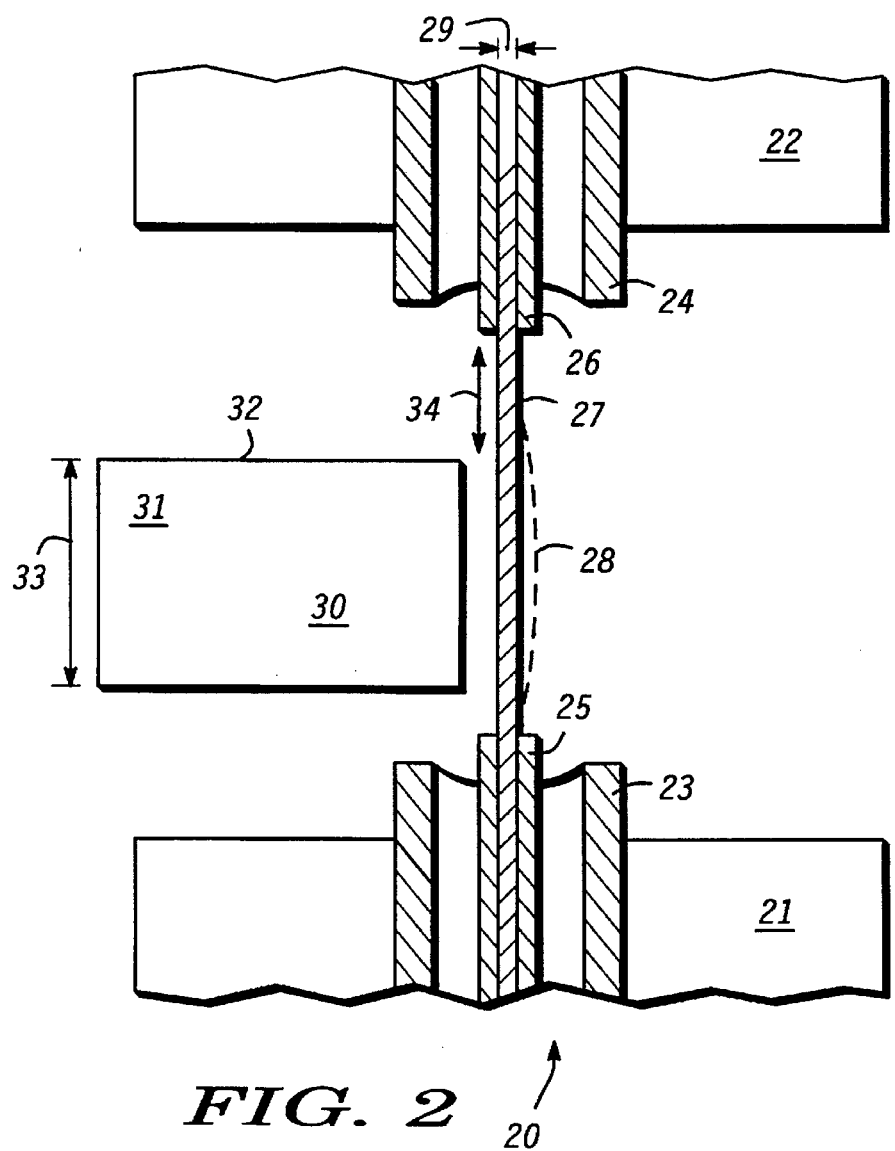
FIG. 2 portrays a partial cross-sectional view of an electrical discharge machine.

Cladding layers 11 and 12 are molded using metallic mold plates which are shaped into a desired configuration using an electrical discharge machine (EDM). FIG. 2 portrays a partial cross-sectional view of an electrical discharge machine 20 and a workpiece or rigid material 30 having a metallic composition. Workpiece 30 has a top surface 32 and an adjacent side surface 31 where top surface 32 faces toward head 22 of EDM 20. Workpiece 30 also has a thickness 33 which, in the preferred embodiment, is approximately 11 millimeters (mm) thick and represents a maximum length of waveguide 10.

EDM 20 uses electric sparks, electric arcs, or other electronic discharges generated between a wire or wire electrode 27 and workpiece 30 to erode and remove metal from workpiece 30 to shape a mold plate. However, while eroding and removing metal from workpiece 30, a portion of wire 27 is also eroded. Therefore, to provide a constant eroding action and to prevent breakage of wire 27, one type of EDM uses a traveling wire for wire 27 to ensure that fresh electrode material is always present and that wire 27 does not break. In particular, referring to FIG. 2, wire 27 runs continuously along an ideally straight line and passes between wires guides 25 and 26 from a feed system to a recovery system (not shown in FIG. 2) at a preferred rate of approximately 2 to 6 meters per minute. Wire guides 25 and 26 are part of heads 21 and 22, respectively, of EDM 20 and are arranged or positioned on either side of workpiece 30 as represented in FIG. 2. During the eroding process, workpiece 30 and heads 21 and 22 can be moved to provide a desired erosion angle and path. However, typically, head 21 remains stationary during the erosion process. In effect, EDM 20 is an electronic band saw where the saw blade is a thin, consumable, moving-wire electrode that never actually touches workpiece 30. However, instead of using cutting or grinding processes in a conventional machine shop practice, a vaporizing, melting, or eroding process is used.

Figure 3:
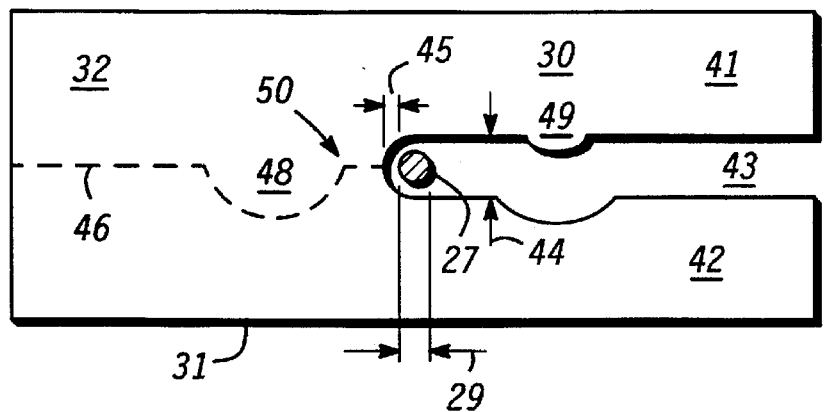
FIG. 3 depicts a top view of a mold plate being manufactured.

Wire 27 moves in relation to workpiece 30 but does not directly contact workpiece 30. Instead, a spark gap 45 is maintained between wire 27 and workpiece 30 as depicted in FIG. 3. Referring back to FIG. 2, a current 34, preferably ranging from approximately 0.1 to 1.6 amperes, is conducted or pulsed through wire 27 creating a pulsed potential between wire 27 and workpiece 30. The pulsed potential generates electric sparks or arcs in spark gap 45. The heat of the electric spark melts or erodes a small portion or volume of workpiece 30.

A dielectric or non-conducting liquid, preferably deionized water, is used to flush the eroded region to remove the eroded material and to cool workpiece 30. The deionized water is preferably sprayed from tubes or nozzles 23 and 24 located on heads 21 and 22, respectively, in FIG. 2. In the preferred embodiment, nozzles 23 and 24 spray the deionized water at a pressure of approximately 0.1 to 0.5 bars and in a path which is parallel to wire 27. Most preferably, as illustrated in FIG. 2, nozzles 23 and 24 are positioned around wire guides 25 and 26 such that the spray of deionized water envelopes wire 27. Proper flushing of workpiece 30 assists in attaining and maintaining a high degree of accuracy and reliability required for most EDM operations. Because the dielectric is used in a closed system where the dielectric is continuously reused, a filter system is used to remove the eroded particles from the dielectric. Otherwise, the eroded particles can clog EDM 20 or convert the dielectric into a conductor.

After the cutting region is flushed, another electric spark is generated to melt or erode another small portion of workpiece 30. This EDM process of sparking, eroding, and flushing is preferably repeated thousands of times per second to shape or form mold plate 41. The efficiency at which the erosion action takes place is largely dependent on the construction and material properties of wire 27. Wire 27 should be electrically conductive to sustain relatively high current densities and should also have relatively high mechanical strength since it must be kept under tension as it moves past workpiece 30 in order for the erosion action to maintain precise tolerances. The preferred amount of tension used is approximately 50 to 150 grams but can vary outside that range depending on several factors including, but not limited to, the diameter of wire 27, the composition of wire 27, and the composition of workpiece 30. Wire 27 preferably comprises tungsten, molybdenum, or other materials having similar electrical and physical properties.

During the EDM erosion operation, a force is exerted on wire 27 which causes wire 27 to bow or bend away from the direction of the erosion path as indicated by dashed line 28 of FIG. 2. The force producing the bowing or bending is predominantly a function of the speed of the erosion, the amount of tension in the wire, and the pressure of the flushing fluid. The bowing or bending of wire 27 decreases the accuracy and precision of the EDM process. Therefore, wire 27 is kept under a predetermined mechanical tension to keep wire 27 moving in a relatively straight line past workpiece 30.

Continuing with FIG. 3, a perspective view of workpiece 30 is depicted as having top surface 32 which is adjacent to side surface 31. In FIG. 3, workpiece 30 has a different orientation compared to FIG. 2. Wire 27 has eroded a path 43 within workpiece 30. Path 43 has a width 44 which is a function of a diameter 29 of wire 27 and a width of spark gap 45. Dashed line 46 illustrates the final shape of a mold plate 41 and a slug 42 which are shaped from workpiece 30. Mold plate 41 has features 48 and 49, with feature 48 being defined by dashed line 46. Preferably, mold plate 41 and slug 42 are formed such that slug 42 remains in one piece. In other words, during shaping of mold plate 41 and slug 42, wire 27 preferably remains within workpiece 30 such that side surface 31 of workpiece 30 is not eroded by wire 27.

Feature 48 has corner 50 which is conventionally shaped or eroded by moving wire 27 along dashed line 46 and by increasing the tension in wire 27 at corner 50 while changing the direction of erosion at corner 50. The increased tension during the "cornering routine" is necessary to ensure a precise corner tolerance. Other process parameters which are changed during a "cornering routine" include reducing the pressure of the deionized water used for flushing and also reducing the travel speed which is the speed at which the cut or burn is made into workpiece 30. However, problems arise when attempting to use this conventional "cornering routine" to fabricate small features on mold plate 41.

In particular, when wire 27 is thin, wire 27 will snap or break during the "cornering routine." The diameter 29 of wire 27 should be smaller than the minimum feature size of mold plate 41 for precise formation of features 48 and 49 and their respective corners. For example, if features 48 and 49 have a diameter of approximately 50 to 250 microns, then the corners of features 48 and 49, such as corner 50, should have a diameter smaller than that of features 48 and 49, or a diameter of preferably about 25 microns. Continuing with the example, if corner 50 of feature 48 has a preferred diameter of approximately 25 microns, diameter 29 of wire 27 should be at least approximately equal to if not less than 25 microns in order to ensure that the precise dimensions of corner 50 are met. However, having such a small diameter, wire 27 is not very strong, and consequently, wire 27 will break or snap when the increased tension is placed upon wire 27 during the "cornering routine."

To circumvent this wire breakage problem, the preferred embodiment of the present invention maintains a constant mechanical tension for wire 27 during the entire cutting, burning, or melting process to shape workpiece 30, including during the formation of corner 50. Furthermore, wire 27 is also moved along dashed line 46. Additionally, the magnitude of current 34, the pressure of the flushing fluid, and the travel speed of the cutting path are also kept constant and are not adjusted during the cornering routine of the present invention. Maintaining constant EDM parameters during the entire EDM process simplifies the EDM process. It is noted that optimization of the EDM parameters which are to be held constant is necessary to ensure that the precise tolerances of mold plate 41 are obtained without breaking wire 27.

After forming mold plate 41, the EDM process can be repeated several times over the surface of mold plate 41 to further refine the shape of features 48 and 49 and to create a final finish on mold plate 41 which may not require additional honing, grinding, or polishing. However, in the preferred embodiment, an additional polish is used. The final finish on mold plate 41 can produce a controlled surface finish or roughness on the molded cladding layer which is used for modal mixing though a waveguide. Mold plate 41 is composed of conventional molding plate materials including, but not limited to, a crucible powered metal or a high alloy steel comprising vanadium, chromium, nickel, and iron.

Figure 4:
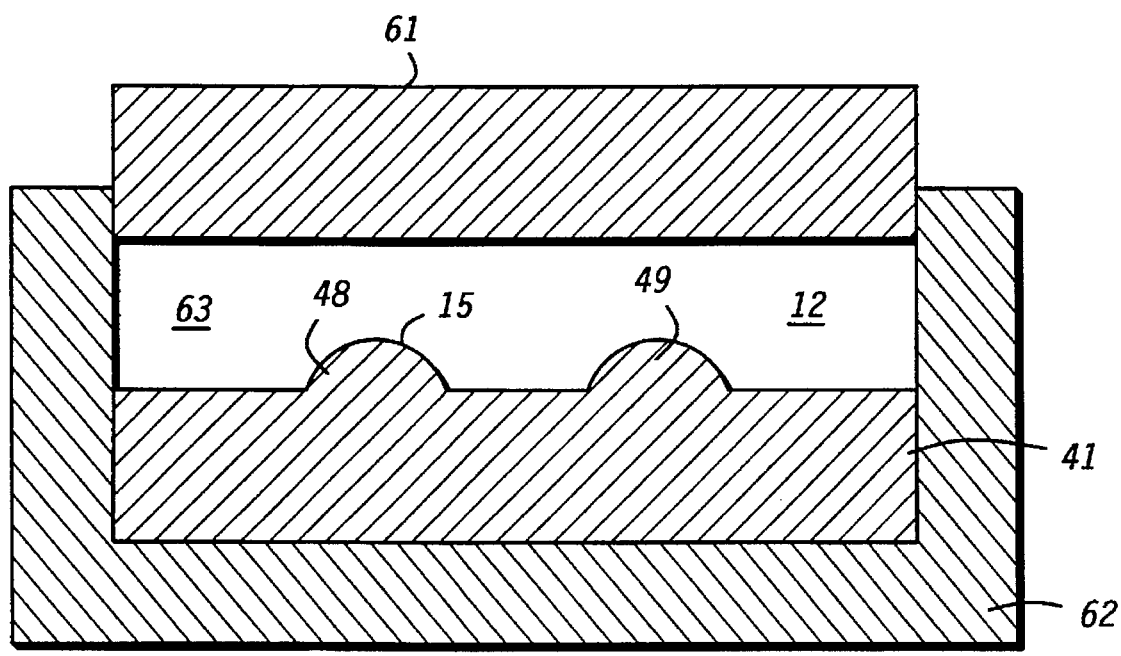
FIG. 4 represents a cross-sectional view of a molding apparatus.

Turning next to FIG. 4, a cross-sectional view of a process using mold plate 41 to mold first portion or cladding layer 12 of waveguide 10 is represented. Mold plate 41 is placed within a recess of a mold plate 62 of a mold apparatus 60. A mold plate 61 is also placed within the recess of mold plate 62 forming an enclosed cavity between mold plates 41 and 61. Mold plates 61 and 62 can be comprised of similar materials as mold plate 41. A molding compound 63 is disposed or injected into the enclosed cavity. Materials suitable for use as a cladding layer in optical applications are preferably used for molding compound 63. Molding compound 63 is molded within the enclosed cavity to form cladding layer 12. Curved edge 15 of cladding layer 12 is formed by feature 48 of mold plate 41.

A material available under the trademark HYSOL MG18 from Dexter Corporation is most preferably used for molding compound 63. By way of example only, a molding temperature of approximately 110 to 175 degrees Celsius (° C.) and a molding pressure of approximately 30 to 75 bars are preferably used. Typically, approximate transfer times range from 30 to 50 seconds at a temperature of approximately 150° C. to 15 to 30 seconds at approximately 175° C. Also, approximate curing times for cross-linking the molding compound range from 3 to 5 minutes at 150° C. to 2 to 4 minutes at 175° C. Molding compound 63 shrinks while curing due to the drying out or evaporation of solvents within molding compound 63. However, during curing, adequate pressure is maintained to assure compaction of molding compound 63. The appropriate transfer and curing times, temperatures, and pressures can extend outside of those ranges listed above depending upon, for example, the size of the cladding layer being molded, the number of pieces being molded, the distance the molding compound is transported, and the desired level of molding compound compaction. Furthermore, pre-heating and post-curing steps can be utilized to achieve higher quality cladding layers.

After the molding of cladding layer 12, cladding layer 11 of FIG. 1 can also be molded using mold plates 41 and 61 of FIG. 4 if cladding layers 11 and 12 are symmetrical. Otherwise, a different set of mold plates can be used to mold cladding layer 11.

Returning to FIG. 1, cladding layers 11 and 12 have been molded and are now aligned to form channels 13 and 14 having a preferred diameter of 30 to 150 microns. Channel 13 contains a waveguide core material 17 which conducts or transmits light. Channel 14 contains a waveguide core material 18 which can be different from but is preferably similar to waveguide core material 17. Waveguide core material or optically transparent material 17 is deposited within or flowed into channel 13 and preferably completely fills channel 13. However, while not shown in FIG. 1, waveguide core material 17 can alternatively be used to coat curved edges 15 and 16 while leaving a central core through which light is transmitted. The central core can contain other materials to create a graded channel or can contain air, other appropriate gases, or even a miniature optical fiber.

Waveguide core material 17 can be a plastic, polyimide, or epoxy which is preferably applied in a liquid state and cured into a solid state using an air drying technique, UV light exposure, or heat treating process. The specific curing method used depends upon the specific material used for waveguide core material 17.

Most preferably, waveguide core material 17 is used as an adhesive or epoxy for coupling or bonding cladding layers 11 and 12 and comprises a material available under the trademark EPO-TEK 353ND from Epoxy Technology, Inc. By way of example only, a curing temperature of approximately 75° to 100° C. can be applied for approximately 50 to 75 minutes at ambient to cure waveguide core material or adhesive material 17. Higher temperatures can be used to cure waveguide core material 17, but the curing temperature should be below the glass transition temperature of cladding layers 11 and 12 to prevent deformation of cladding layers 11 and 12 during the curing of waveguide core material 17.

To ensure that the transmitted light remains within channels 13 and 14, the index of refraction, $N_{(wcm)}$, for waveguide core materials 17 and 18 should be greater than the index of refraction, $N_{(cl)}$, for cladding layers 11 and 12. $N_{(wcm)}$ is preferably at least 0.028 larger or greater than $N_{(cl)}$. For the preferred embodiment described above, $N_{(wcm)}$ and $N_{(cl)}$ are approximately 1.588 and 1.535, respectively. However, in an alternative embodiment of the present invention, $N_{(cl)}$ and $N_{(wcm)}$ range from approximately 1.50 to 1.54 and 1.54 to 1.60, respectively. The actual indices of refraction are chosen to match the light acceptance angle of a mating fiber. Therefore, if a different mating fiber were used with waveguide 10, then the ranges given for $N_{(cl)}$ and $N_{(wcm)}$ may deviate significantly from those listed above.

To maintain high light transfer efficiency, the other constraint concerning the refractive indices of waveguide 10 is that the numerical aperture of the waveguide, $N_{A(waveguide)}$, should be similar to the numerical aperture of a fiber, $N_{A(fiber)}$, when the fiber is connected to the waveguide. $N_{(cl)}$, $N_{(wcm)}$, $N_{A(waveguide)}$, and $N_{A(fiber)}$ are related by the following formula:

$$N_{A(waveguide)} = N_{A(fiber)} = \sin\theta = \sqrt{N_{(wgm)}^2 - N_{(cl)}^2}$$

where θ is defined as the half angle of light transmitted into and out of waveguide 10.

Curved edges 15 and 16 of channel 13 provide significant advantages over conventional square or rectangular channels. In particular, curved edges 15 and 16 of channel 13 prevent stagnant light transmission which may occur at sharp corners of a waveguide channel. Elimination of conventional square or rectangular channels prevents light from being trapped in the sharp corners and, therefore, improves light transfer efficiency.

Moreover, stress gradients are less pronounced in a channel having rounded edges or surfaces compared a channel having sharp corners. As a result of the more uniform stress distribution in a round channel, waveguide core material 17 is less likely to delaminate from curved edges 15 and 16, and therefore, the reliability of waveguide 10 is improved and light transfer efficiency is maintained.

The controlled surface finish or roughness of curved edges 15 and 16 and the interface between waveguide core material 17 and curved edges 15 and 16 are also important for modal mixing of the transmitted light. While waveguide 10 can be used for single mode transmission, which is also referred to as collimated light transmission, the preferred transmission method uses modal mixing, or scattered light. A waveguide which transmits light in a single mode can have a loss of light intensity at its interface with an optical fiber. The decrease in light intensity can be a result of, for example, misalignment of the optical fiber and the waveguide. Consequently, the amount of background or modal noise is increased relative to the actual signal intensity and the likelihood of incorrect data interpretation, or the bit error rate, is also increased. In other words, the modal noise is proportional to the bit error rate. However, the use of modal mixing during light transmission through a waveguide seduces the detrimental effects of misalignment with an optical fiber, and as a result, the relative amount of modal noise and the bit error rate are not significantly increased as in the case of single mode transmission.

While the invention has been particularly shown and described with reference to preferred embodiments, it will be understood by those skilled in the art that changes in form and detail may be made without departing from the spirit and scope of the invention. For example, curved edge 16 of cladding layer 11 can contain a larger portion of channel 13 compared to curved edge 15 of cladding layer 12. As an additional example, channel 13 can be oval, square, triangular, or other appropriate shape instead of the preferred circular configuration. In addition, a different cladding layer material having a different index of refraction can be used for cladding layer 11 compared to cladding layer 12, or a different waveguide core material having a different index of refraction can be used for waveguide core material 17 and 18.

Therefore, in accordance with the present invention, it is apparent there has been provided an improved method of fabricating an optical waveguide which overcomes the disadvantages of the prior art. The subject invention produces a waveguide having circular channels which are capable of modal mixing and have improved reliability compared to channels having corners. The method of the present invention is manufacturable and is not expensive.

We claim:

1. A method of fabricating an optical waveguide, the method comprising the steps of:

providing a first mold plate;

providing a second mold plate having a corner, the second mold plate manufactured using a process comprising:
   providing a workpiece;
   providing an electrical discharge machine having a wire;
   conducting a current through the wire to shape the workpiece;
   creating a tension in the wire while shaping the workpiece; and
   maintaining the tension in the wire while forming the corner in the workpiece to form the second mold plate;

disposing a molding compound between the first mold plate and the second mold plate to form a first portion of the optical waveguide, wherein the molding compound has a first index of refraction;

forming a second portion of the optical waveguide; and coupling the first portion and the second portion of the optical waveguide to form a core.

2. The method according to claim 1, wherein the coupling step further comprises forming curved edges for the core.

3. The method according to claim 1, wherein the coupling step further includes forming a diameter less than 250 microns for the core.

4. The method according to claim 1, further including disposing a waveguide core material in the core, the waveguide core material having a second index of refraction.

5. The method according to claim 4, further including providing the second index of refraction greater than the first index of refraction.

6. The method according to claim 4, further including providing the second index of refraction approximately between 1.54 and 1.60 and providing the first index of refraction approximately between 1.50 and 1.54.

7. The method according to claim 4, further including providing an adhesive material for the waveguide core material.

8. The method according to claim 1, wherein forming the second portion of the optical waveguide includes disposing the molding compound between the first and second mold plates.

9. The method according to claim 1, further including polishing the second mold plate by using the process for manufacturing the second mold plate.

10. A method of molding an optical waveguide, the method comprising the steps of:

fabricating a first mold plate by providing an electrical discharge machine having a wire, by providing a workpiece, by creating a spark gap between the wire and the workpiece when passing a current through the wire, creating a tension in the wire, and by shaping a corner in the workpiece while keeping the tension and the current in the wire;

providing a second mold plate;

molding a first cladding layer between the first mold plate and the second mold plate;

molding a second cladding layer; and forming at least one channel by coupling the first cladding layer and the second cladding layer.

11. The method according to claim 10 further comprising positioning an optically transparent material in the at least one channel and between the first and second cladding layers.

12. The method according to claim 11 further including using the optically transparent material to couple the first and second cladding layers.

13. The method according to claim 11 further including providing a first index of refraction of the optically transparent material greater than a second index of refraction of the first cladding layer and greater than a third index of refraction of the second cladding layer.

14. The method according to claim 10 further comprising providing a diameter less than 250 microns for the at least one channel.

15. The method according to claim 10 further including providing round edges for the at least one channel.

16. The method according to claim 10 further including providing symmetrical cladding layers for the first and second cladding layers.

17. A method of fabricating a waveguide, the method comprising the steps of:

manufacturing a first mold plate using a process comprising the steps of:
    providing a rigid material;
    providing an electrical discharge machine having a wire with a current of a magnitude, the wire having a tension; and
    shaping the rigid material with the wire to manufacture the first mold plate, wherein, shaping the rigid material includes forming a corner in the rigid material while maintaining the magnitude of the current in the wire and while maintaining the tension in the wire;

providing a second mold plate;

using the first mold plate and the second mold plate to mold a first portion of the waveguide having a first index of refraction;

forming a second portion of the waveguide having the first index of refraction;

aligning the first portion and the second portion of the waveguide to form a channel through the waveguide;

filling the channel with an optically transparent material having a second index of refraction larger than the first index of refraction; and using the optically transparent material to bond together the first portion and the second portion of the waveguide.

18. The method according to claim 17, further including using the first and second mold plates to form the second portion of the waveguide.

19. The method according to claim 17, wherein the step of aligning forms a channel having round edges and a diameter less than 250 microns.

20. The method according to claim 17, further including providing the second index of refraction at least 0.028 larger than the first index of refraction.

* * * * *